United States Patent [19]

Warren

[11] Patent Number: 4,690,446
[45] Date of Patent: Sep. 1, 1987

[54] BUMPER STRIP FOR AUTOMOBILES

[75] Inventor: Monty Warren, Mississauga, Canada

[73] Assignee: Dorfender Products Inc., Mississauga, Canada

[21] Appl. No.: 869,019

[22] Filed: May 30, 1986

[51] Int. Cl.$^4$ .................... B60R 19/14; B60R 19/42
[52] U.S. Cl. .................................. 293/128; 293/102; 296/207; 428/12; 428/31; 206/83.5
[58] Field of Search ................ 296/207; 293/1, 102, 293/120, 128; 428/12, 31, 124; 24/442, 306; 242/1; 206/83.5

[56] References Cited

U.S. PATENT DOCUMENTS

| | | | |
|---|---|---|---|
| 3,132,780 | 5/1964 | Binding | 293/155 |
| 3,147,176 | 9/1964 | Haslam | 293/128 |
| 3,704,037 | 11/1972 | Glassberg | 428/31 X |
| 3,731,348 | 5/1973 | Luehne | 24/442 X |
| 3,832,263 | 8/1974 | Cleveland et al. | 428/12 X |
| 4,014,583 | 3/1977 | Forbes | 293/128 |

*Primary Examiner*—Dennis H. Pedder
*Attorney, Agent, or Firm*—Sim & McBurney

[57] ABSTRACT

A foldable add-on side protection device for automobiles or the like includes an elongate strip of impact-absorbing resilient material, and an elongate strip of backing material bonded to the resilient material. The resilient material is separated into a plurality of sections of various lengths without interrupting the strip of backing material, so that the backing material may act as a hinge to allow the side protection device to be wound spirally upon itself in a compact and surface abutting manner. Velcro-like hoop and loop pressure attachable material on the surface of the resilient material and the surface of the backing material at spaced locations is provided for detachably connecting adjacent portions of the side protection device together when in the wound-up condition. A number of lengths of magnetic strip material are bonded to the resilient material remote from the backing material, to allow the side protection device to be magnetically adhered to a metallic vehicle.

5 Claims, 4 Drawing Figures

BUMPER STRIP FOR AUTOMOBILES

This invention relates generally to side body protection devices for automobiles and the like, and has to do particularly with such a device capable of being folded up upon itself for small-volume storage.

BACKGROUND OF THIS INVENTION

The prior art contains a number of previous designs for detachable protection strips for vehicles, and the following are exemplary:

U.S. Pat. 3,582,134, issued June 1, 1971 to Shaff, is directed to a strip incorporating magnets and a stiffening wire. However, the strip does not have any convenient method for being rolled up and stored.

U.S. Pat. 3,659,887, issued May 2, 1972 to Marquette, shows a similar detachable protector held in place by magnets. The protector is telescopingly slidable.

Both of the foregoing prior art designs suffer from the disadvantage that the individual portions are easily stolen from the side of the automobile. This problem is particularly acute in view of the fact that the strips are in several different pieces.

U.S. Pat. 3,472,546, issued Oct. 14, 1969 to Samuels, discloses an embodiment of a side protection strip which incorporates hooks that engage the side edges of the door, thus providing some discouragement to theft. However, the strip does not have any convenient means for being wrapped up upon itself.

U.S. Pat. 3,687,792, issued Aug. 29, 1972 to Ruff, is directed to a decorative trim strip incorporating a plastic bumper bonded to a decorative surface, and is not intended to be an easily removable protection strip.

U.S. Pat. 4,498,697, issued Feb. 12, 1985 to McGlone et al, is directed to a portable vehicle protection tube incorporating a magnet which is flexible. However the strip has no convenient means for being wrapped up to form a small-volume item.

GENERAL DESCRIPTION OF THIS INVENTION

In view of the shortcomings of the prior art as described above, it is an object of one aspect of this invention to provide a side protection device for automobiles which is formed as a unitary item, but capable of being wrapped up upon itself so as to occupy the least possible volume, and having means by which it can be secured to the automobile in such a way as to discourage theft.

More particularly, this invention provides a foldable add-on side protection device for automobiles and the like, comprising:

an elongate strip of impact-absorbing resilient material, an elongate strip of backing material bonded to the resilient material, the strip of resilient material being separated into a plurality of sections of various lengths without interrupting the strip of backing material, thereby to allow the side protection device to be wound upon itself in a compact manner, means on the surface of the resilient material remote from the backing material and on the surface of the backing material remote from the resilient material for detachably connecting to each other adjacent portions of the side protection device when in the wound up condition, and a plurality of lengths of magnetic strip material bonded to the resilient material remote from the backing material, at spaced intervals along the side protection device.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
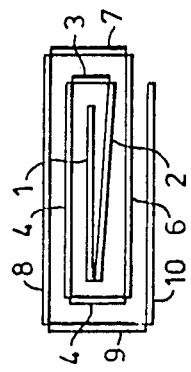
FIG. 1 is a schematic view showing the geometric relationship of different connected sections of the side protection device of this invention.

Attention is first directed to FIG. 1, which is a line drawing representing the "scrolled" configuration of various foldable sections of an elongated side protection device. The lines numbered 1–10 do not correspond precisely to the relative lengths of the sections, but are merely to show how the individual sections are folded.

Figure 2:
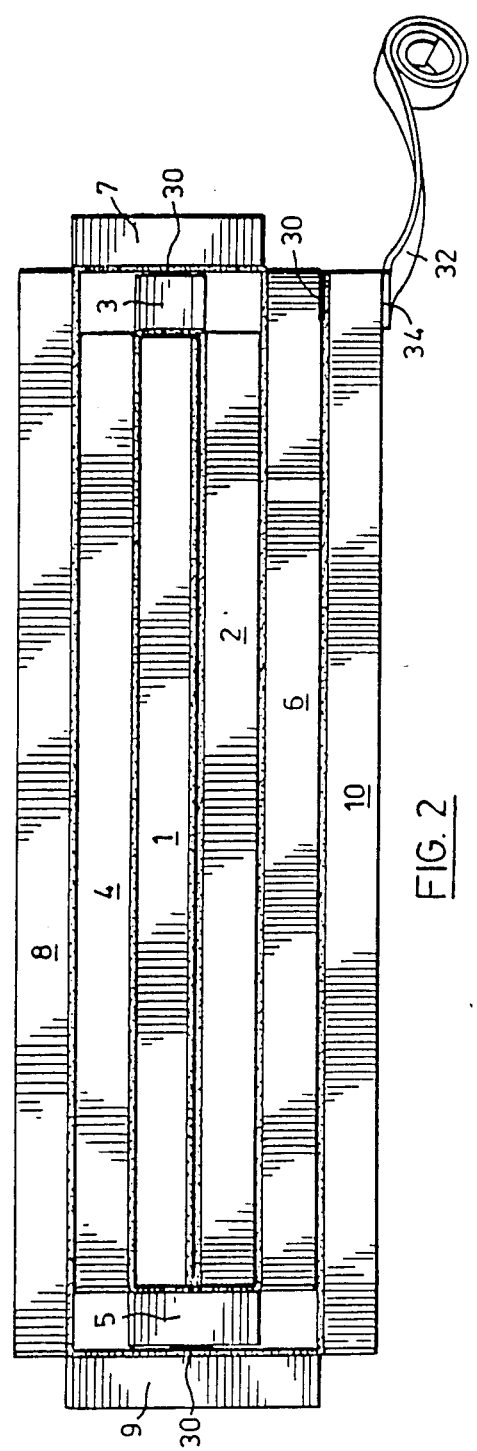
FIG. 2 is an edge view of the side protection device in its folded, storage condition.

FIG. 2 is an accurate edge view of the side protection device in folded condition.

Figure 3:
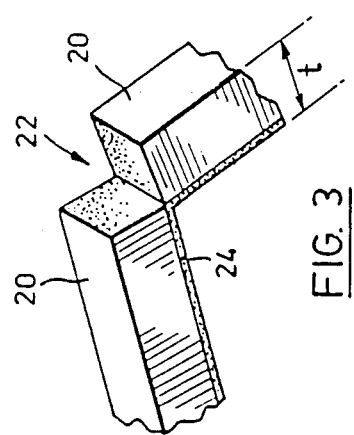
FIG. 3 is a partial perspective view of the side protection device.

In order to allow the folding of the individual sections, it is important to understand the structure of the device itself, and this is shown best in FIG. 3. The device comprises firstly an elongate strip 20 of impact-absorbing resilient material, and an elongate strip 24 of resilient backing material bonded to the resilient material 20.

The strip 20 of resilient material is separated into a plurality of sections of various length, these being the sections denoted by the numbers 1–10 in FIG. 1, without interrupting the strip 24 of backing material, thereby to allow the backing material 24 to act as a hinge at the locations of separation, and further to allow the side protection device itself to be wound upon itself in a compact manner. One of the locations of separation is shown at 22 in FIG. 3.

Looking at FIGS. 1 and 2, it will be seen that the particular embodiment of the invention illustrated in these figures is such that the resilient material 20 is separated into sections of various lengths, thereby to facilitate the wrapping up of the device in a compact manner. More particularly, the various sections, beginning from one end, have the following sequence:

(a) a first section 1 having a first length which may be in the region of 15" to 16" as a non-limiting example;

(b) a second section 2 having a length substantially the same as the first length 1, although it may be slightly longer;

(c) a third section 3 having a length substantially the same as the thickness of the side protection device taken perpendicular to the mating surface between the resilient and the backing strip, the thickness being shown in FIG. 3 as the dimension t;

(d) a fourth section 4 having a length substantially the same as the length of the first section 1;

(e) a fifth section 5 having a length substantially twice the length of the third section, i.e. substantially twice the thickness t;

(f) a sixth section 6 having a length substantially equal to the sum of the first length plus the width of the third section;

(g) a seventh section 7 having a length substantially equal to three times the length of said third section;

(h) an eighth section 8 having a length substantially equal to the sum of the first length plus twice the width of the third section;

(i) a ninth section 9 having a length substantially equal to four times the length of the third section;

(j) and a tenth section 10 having a length substantially equal to the length of the eighth section.

The invention further incorporates means on the surface of the resilient material 20 remote from the backing material 24, and on the surface of the backing material 24 remote from the resilient material 20, for detachably connecting to each other adjacent portions of the side protection device when in the wound up condition.

Figure 4:
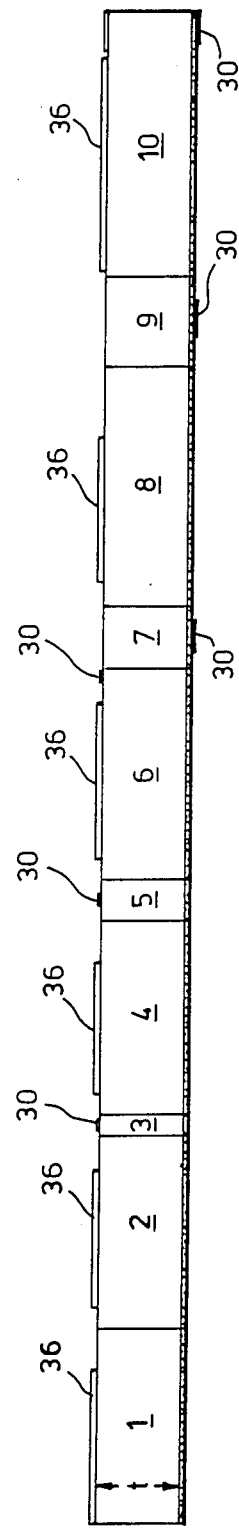
FIG. 4 is a further edge view thereof, in a partially unfolded condition, to more clearly indicate the position of connecting elements.

More particularly, in the preferred embodiment the device incorporates strips of the hook-and-loop pressure attachable material known as Velcro TM located on the resilient material 20 of the third, fifth and sixth sections 3, 5 and 6, the Velcro strip on the sixth section 6 being adjacent the seventh section 7. The means further incorporates Velcro strips complementary to the first-mentioned Velcro strips (i.e. cooperating therewith in a gripping manner) on the backing material of the seventh, ninth and tenth sections 7, 9 and 10, with the Velcro material on the tenth section 10 being remote from the ninth section 9. In FIG. 4, the Velcro strips are identified by the numeral 30, and are positioned in the manner just described.

In addition to the aforesaid components, the preferred embodiment of the side protection device incorporates a flexible security strap 32 attached at 34 to one end of the section 10. The flexible security strap 32 is adapted to be snagged in the trunk of an automobile or the like with which the side protection device is being used.

Finally, the device according to this invention incorporates a plurality of lengths of magnetic strip material shown at the numeral 36 in FIG. 4, which are bonded to the resilient material 20 remote from the backing material 24, at spaced intervals along the device. It is emphasized that the particular distribution of the magnetic strip material 36 is not critical, but that it merely should be distributed in such a way as to firmly hold the device against the side of an automobile in a secure manner. If desired, the magnetic strip material 36 could be distributed along the complete lengths of all of the major sections of the device, i.e. those numbered 1, 2, 4, 6, 8 and 10. Further, the magnetic strip material 36 could be distributed as two spaced-apart strips along opposite edges of the upper surface of the device as pictured in FIG. 4, i.e. spaced apart in a plane normal to the plane of the drawing paper.

Merely as an illustrative example which is not intended to be limiting in any way, the longitudinal dimensions of the various sections of the side protection device may be as follows. The thickness t may be approximately $1\frac{1}{2}''$. The sections 1 through 10 may ° have, respectively, the following longitudinal dimensions: $15\frac{1}{2}''$, $15\frac{5}{8}''$, $1\frac{3}{4}''$, $15\frac{3}{4}''$, $3\frac{5}{8}''$, $17\frac{1}{2}''$, $5\frac{1}{4}''$, $19\frac{1}{4}''$, $7''$ and $19\frac{3}{4}''$. The thickness t of the device, although given as $1\frac{1}{2}''$, would functionally be somewhat greater than that, due to the addition of the Velcro strips 30 and the magnetic strips 36. The dimensions given for the sections 1-10 have taken into account the fact that the functional thickness is somewhat greater than $1\frac{1}{2}''$.

Merely by way of example, the strip 20 of resilient material may be made from closed cell sponge polyethylene, and the strip 24 of backing material may be made from vinyl.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

8.

1. A foldable add-on side protection device for automobiles and the like, comprising:

an elongate strip of impact-absorbing resilient material, backing material in strip form surface-attached to the resilient material.

the strip of resilient material being separated into a plurality of sections of various lengths while the strip of backing material is continuous across each location where the resilient material is separated, thereby to allow the device to be wound upon itself in a compact spiral, the sections into which the strip of resilient material is separated comprising in sequence, beginning from one end;

(a) a first section having a first length, (b) a second section having a length substantially the same as said first length, (c) a third section having a length substantially the same as a width of the side protection device taken perpendicular to the surface between the resilient and the backing strip, and (d) a fourth section having a length substantially the same as the first length, means on the resilient material and on the backing material for detachably connecting to each other adjacent portions of the device when in the wound up condition, and magnetic means attached to the protection device, whereby the first, second and fourth sections, when wound, are parallel, and the third section is perpendicular thereto, in abutment to an end of the first section.

2. The invention claimed in claim 1, in which the strip of resilient material is further separated into sections, beiginning after the fourth section, comprising in sequence:

(e) a fifth section having a length substantially twice the length of the third section, (f) a sixth section having a length substantially equal to the sum of the first length plus said width of the third section, (g) a seventh section having a length substantially equal to three times the length of said third section, (h) an eighth section having a length substantially equal to the sum of the first length plus twice said width, (i) a ninth section having a length substantially equal to four times the length of the third section, (j) and a tenth section having a length substantially equal to the length of the eighth section.

3. The invention claimed in claim 2, in which the connecting means comprises strips of hook-and-loop pressure attachable material located on the resilient material of the third, fifth and sixth section, the pressure attachable strip on the sixth section being adjacent the seventh section, said connecting means further comprising pressure attachable strips on the backing material of the seventh, ninth and tenth sections, the pressure attachable material on the tenth section being remote from the ninth section.

4. The invention claimed in claim 1, further comprising a flexible security strap secured to one end of the side protection device and adapted to be snagged in a closed door of an automobile or the like with which the side protection device is being used.

5. The invention claimed in claim 2, further comprising a flexible security strap secured to one end of the side protection device and adapted to be snagged in a closed door of an automobile or the like with which the side protection device is being used.

* * * * *